United States Patent [19]

Gladow

[11] Patent Number: 5,058,872
[45] Date of Patent: Oct. 22, 1991

[54] CHAIN CAM

[75] Inventor: Dean E. Gladow, Emporia, Kans.

[73] Assignee: Didde Web Press Corp., Emporia, Kans.

[21] Appl. No.: 390,830

[22] Filed: Aug. 8, 1989

[51] Int. Cl.[5] .......................................... B65H 29/46
[52] U.S. Cl. ...................................... 270/30; 270/39; 270/37; 74/37
[58] Field of Search ........................ 270/30, 31, 32, 37, 270/39, 40, 41, 45, 52.5, 52; 74/37, 84, 567, 568

[56] References Cited

U.S. PATENT DOCUMENTS

| | | | |
|---|---|---|---|
| 3,086,768 | 4/1963 | Lach | 270/39 |
| 3,406,580 | 10/1968 | Zappia | 74/37 |
| 4,645,191 | 2/1987 | Archibald | 270/39 |
| 4,871,157 | 10/1989 | Hermarr | 270/39 |

FOREIGN PATENT DOCUMENTS

| | | | |
|---|---|---|---|
| 1408247 | 7/1965 | France | 270/39 |
| 815363 | 3/1981 | U.S.S.R. | 74/37 |

Primary Examiner—Edward K. Look
Assistant Examiner—Therese M. Newholm
Attorney, Agent, or Firm—Hovey, Williams, Timmons & Collins

[57] ABSTRACT

A working mechanism adaptable for producing virtually an infinity of different motions is provided which finds practical utility in a variety of contexts such as the handling of zigzag folded webs. The mechanism preferably includes at least one elongated working element pivotally supported at the inner end thereof and coupled by a pivotal link to an elongated, flexible, continuing closed-loop motion-imparting member such as a chain or belt. Advantageously, the mechanism may comprise a plurality of elongated working elements each coupled with a pair of closed loop path motion-imparting members to produce complex, variable speed motions heretofore difficult to achieve. In a web-handling device, the chain cam mechanism has a rotatable shaft pivotally supporting the inner ends of the elements, along with an endless chain cam-like member coupled via pivotal linkage arms to points intermediate the ends of the elements; the resultant path of travel of the outer or working ends of the elements is dependent upon the geometry of the components and can be readily changed to accommodate different working environments. A novel method and apparatus for handling zigzag folded webs makes use of a pair of identical, laterally spaced apart chain cam working mechanisms with respective working elements being joined at the outer ends thereof by means of corresponding, transverse web-engaging structures. The chain cam mechanisms create a motion serving to successively separate facially opposed and interconnected sheets, whereupon a trailing web-engaging structure engages the sheets and moves the same for further processing such as collation or stapling.

36 Claims, 7 Drawing Sheets

CHAIN CAM

BACKGROUND OF THE INVENTION

1. Field of the Invention

This invention relates to a working mechanism having utility in a variety of applications and being operable to reliably move one or a plurality of elongated working elements at variable speeds along a virtual infinity of complex paths. The mechanism specifically can be adapted to successively separate interconnected sheets of a zigzag folded web and move the sheets for further processing such as collation or stitching.

2. Description of the Prior Art

Very few mechanical devices are known for providing variable speed motion along an irregular closed loop path, as opposed to the numerous devices available for producing reciprocable or rotatable movements. Generally, complex motions in machinery have conventionally been provided by employing various cam mechanisms having a camming surface in cooperative engagement with a cam follower. While such devices may be satisfactory for driving a single movable element connected to the cam follower, a variety of virtually insurmountable problems are encountered when more than one movable element is needed.

By way of example, a cam controlled Geneva wheel can produce a rotational movement having a variable speed. In this device, a driving disc carries a radially movable pin which has a longitudinal axis parallel to the rotational axis of the disc. As the disc rotates, the pin enters an internal fixed cam pathway which moves the pin in a radial direction relative to the disc. Additionally, an output wheel adjacent the disc has a radially oriented slot engageable with the pin when the latter travels along the cam pathway, whereby the rotational speed of the output wheel varies as the pin follows the configuration of the pathway. Obviously, such a device cannot be used to simultaneously provide dissimilar movement to a number of working elements connected to the output wheel. Additionally, the Geneva typically can move the working elements only in a rotational direction unless an additional, motion-translating device is used.

Other cam constructions have been proposed in the past to provide both non-circular movement and acceleration and deceleration along the path of travel. U.S. Pat. No. 3,777,927, for example, discloses a cam device comprising a number of Z-shaped working elements pivotally coupled at spaced intervals to a movable, endless roller chain. A cam on one leg of each of the elements selectively engages a stationary camming surface disposed at a certain location adjacent the chain, such that the element will supposedly pivot as the chain moves the element near the camming surface. A working portion on the element remote from the cam thus swings relative to chain movement in an attempt to fold the rear flaps of boxes traveling on an adjacent conveyor. Unfortunately, the swinging movement of the element cannot always be precisely controlled because the cam is not confined to a location adjacent the camming surface.

So-called internal cams have been proposed in the past in attempt to overcome the deficiencies of conventional cam devices, and to provide irregular motions for associated linkage arms or the like. However, use of the internal cams inherently presents numerous obstacles which cannot be easily overcome. For instance, very irregular cam pathways must be precisely machined to eliminate undesirable "slop" or "give" which could otherwise allow undesired movement of the cam. Such tolerances are particularly important whenever the cam mechanism is designed to provide a motion reversal of the associate linkage arm, inasmuch as the cam must move from a "leading" to a "lagging" position relative to the linkage arm. Additionally, other mechanisms may be required to ensure that the cam is either leading or lagging as the cam is moved away from the changeover position. Thus, use of such internal cam devices has been rather limited to mechanisms which provide a relatively slow movement along a somewhat simple path of travel.

SUMMARY OF THE INVENTION

The working mechanism of the present invention can be constructed in a variety of configurations such that respective working portions of elongated working elements are moved along any one of a number of precise, closed loop pathways; also, the mechanism may be designed to accelerate and decelerate the working elements during the travel thereof along the working path. Moreover, motion reversals of the working elements can readily be accomplished.

Broadly speaking, the working mechanism of the invention includes at least one and usually a plurality of elongated working elements such as bars or links having a working (usually outer) end, together with mechanism for shifting the working elements along a precise working path. The working element or elements have first and second spaced apart connection structures thereon for connection to, respectively, a support such as a pivotal mounting and an elongated flexible motion-imparting member (e.g., a continuous roller chain which moves along a closed loop path of travel). Apparatus is also provided for shifting the closed-loop motion-imparting member along the path of travel thereof.

Advantageously the mechanism has first and second motion-imparting members each shiftable along corresponding, continuous, closed loop paths of travel, with at least one of the members comprising the elongated, endless flexible component. Means are also provided for operably coupling the first and second motion-imparting members to the working elements at corresponding spaced apart attachment locations along the length of the elements; at least one, and preferably both, of the motion-imparting members are pivotally coupled with the working elements. Finally, the overall mechanism includes apparatus for shifting the motion-imparting members along their respective paths of travel in order to thereby shift the elements along the desired working path.

In one form of the invention, the mechanism has a rotatable body which pivotally supports the inner ends of plural elongated working elements. Also, a movable endless chain cam-like member adjacent the rotatable body carries a number of pivotal linkage arms at spaced intervals which are in turn pivotally coupled to corresponding working elements at points intermediate the ends thereof. The chain advantageously moves synchronously with the rotatable body, and the resultant path of travel of the working portions of the elements is dependent upon the geometry of the components, such as the chain path, the length of the arms and the shape of the body.

In certain forms of the invention, the inner ends of the elements move in a circular path by means of pivotal connections to a rotatable shaft or round disc, and a roller chain is trained about appropriate stationary guides and sprockets to achieve the desired motion. Linkage arms are attached at spaced intervals along the length of the chain and also are pivotally coupled to the elements, such that the arms pivot or otherwise move the elements during simultaneous, circular motion of the inner end of the elements. Consequently, the mechanism can be constructed such that the working portions move along a highly complex path, yet can also accelerate or decelerate as the angle between the arm and the element is varied.

In one specific application of the invention, a chain cam mechanism is provided to support elongated, cross-sectionally V-shaped, transversely extending, web-engaging bars, the latter being secured to corresponding ones of the working elements of the chain cam mechanism. The chain cam mechanism is designed so that the working element supporting each V-bar moves along a path such that the V-bars successively engage folded web regions between interconnected sheets of zigzag folded, continuous aligned webs, whereupon the folded regions are then moved to a stitching device. Each of the V-bars is widely spaced from the next trailing V-bar at the web pickup location so as to ensure that the next adjacent sheet pair is properly opened for the succeeding V-bar. However, as each of the V-bars continues around its closed loop path, it is decelerated to a relatively slow speed as the engaged webs approach the stitching device and is then stopped to permit accurate stitching of the webs Thereafter, the V-bars are again accelerated in a downward direction to permit the stitched webs to disengage from the V-bars and collect in a second stack. In this application, the instant invention is operable to move the working elements along a somewhat simple path with appropriate variance of the speed and spacing of the outer transverse V-bars.

In another specific application, a web handling apparatus is provided having a pair of laterally spaced apart chain cam mechanisms for creating a working motion serving to successively separate and lift zigzag-folded web sheets of a continuous web to an overlying position for engagement with an overhead conveying means. In this construction, the working elements are specially configured wire forms pivotally coupled to the juxtaposed chain cam mechanisms, with transversely extending web-engaging stretches of the forms extending between the mechanisms. The wire forms are successively moved in a generally crescent shaped pathway from a web pickup location toward the overhead conveying means, whereupon the web is grasped by the conveyor for further handling. Next, the wire forms are successively disengaged from the web and rapidly descend to the pickup location for another cycle. The roller chains forming a part of the chain cam mechanisms precisely control the position of each of the wire form elements as the latter reverse their motion along the path from top to bottom.

The chain cam mechanism of the instant invention is suitable for use in a wide variety of other applications apart from the web handling methods as disclosed hereinabove. The variety of complex, variable speed motions is limited only by the imagination, yet the numerous possible constructions present few of the design constraints common to working mechanisms heretofore known in the art.

DESCRIPTION OF THE PREFERRED EMBODIMENTS

As indicated above, the chain cam mechanisms of the present invention can be used in a wide variety of contexts in order to provide precise, reliable irregular working motions, particularly those requiring variations in speed or direction. Indeed, using the principles of the present invention, one can design working mechanisms giving an infinity of highly complex working motions.

Figure 1:
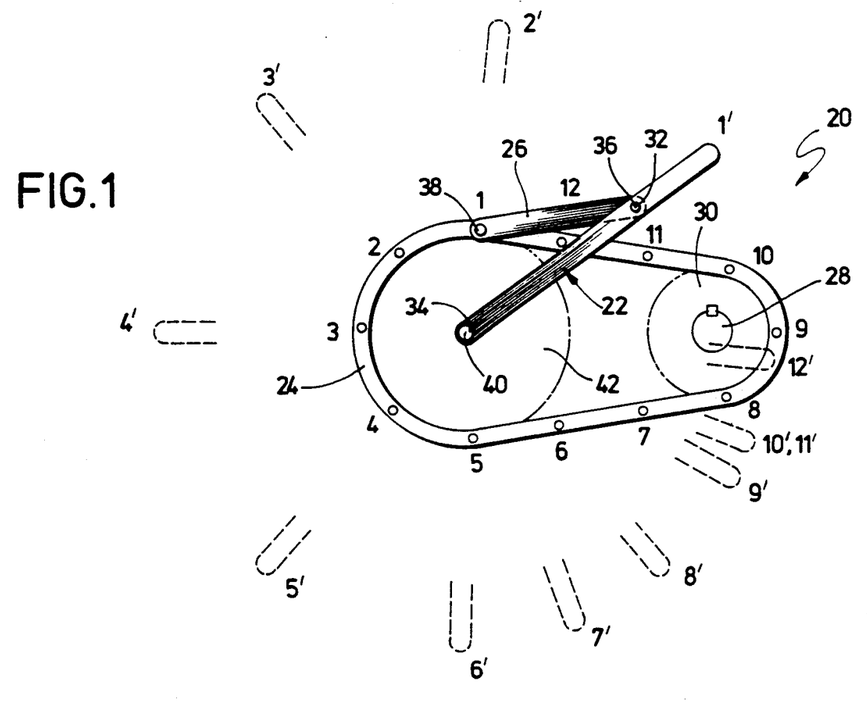
FIG. 1 is a schematic view of a working mechanism in accordance with the invention employing a single elongated working arm pivotally supported at its inner end and moved along a working path by means of an endless chain and link, and with representative positions of the outer working end of the element during movement thereof shown in phantom.

In order to impart a fuller understanding of the scope of the present invention, attention is initially directed to FIGS. 1-4 which illustrate in a schematic fashion certain of the possible designs and modifications in accordance with the invention. Thus, FIG. 1 depicts a mechanism 20 having an elongated, rigid working element 22 together with an elongated, flexible motion-imparting member 24 (e.g., a continuous roller chain) which is shiftable along a continuous, closed loop path of travel. Means are provided for connecting the member 24 to the element 22, in this case an elongated link 26 which is pivotally coupled adjacent the opposed ends thereof to the member 24 and element 22 respectively. The member 24 is shifted along its path of travel by means of apparatus including a prime mover (not shown) operatively coupled to a shaft 28; the latter is in turn keyed to a rotatable sprocket 30 which engages and shifts the member 24.

As will be seen, the working element 22 includes first and second connector structures 32, 34, here in the form of appropriate apertures, which are spaced apart along the length of the working member. The link 26 includes a connection pin 36 which is operatively received within the aperture defining the first connection structure 32; further, the opposite end of the link 26 is pivotally coupled by conventional pin means 38 to the flexible member 24.

The inner or second connection structure 34 is pivotally secured to a pin 40, the latter being located at the axis of and rotatably supporting an idler sprocket 42.

As will be readily apparent from the foregoing description, the motion of the working element can occur in either direction, i.e., the link 26 can either pull or push the working element 22. The resultant motion of any point on the elongated working element 22 is a circular path. However, as will be explained, the resultant motion of the element 22 throughout a complete cycle is non-uniform.

Considering first counterclockwise motion of the working element 22, it will be appreciated that the three pivot points represented by the pins 36, 38 and 40 retain their relative positions as long as the portion of the flexible chain 24 supporting the pin means 38 remains in contact with the driven sprocket 42. During this phase of the motion of working element 22, the angular displacement of the element 22 is directly proportional to the motion of the flexible drive member 24. That is to say, any point on the working element 22 moves through the same angle as any point on the portion of the flexible drive member which is in contact with the underlying guide or idler sprocket 42. With reference to FIG. 1, it will be seen that five positions of the pivot pin 38 as it traverses sprocket 42 have been labeled as 1-5; on the other hand, the corresponding positions of the outer end of the working element 22 have been shown in phantom and labeled as 1'-5'. As illustrated, the motion of the outer end during this phase of operation is regular and circular.

However, as motion of the working element 22 proceeds in a counterclockwise direction, with the pin 38 passing through positions 6-12 and the outer end of element 22 passing through positions 6'-12', equal amounts of motion of the flexible drive member 24 no longer produce equal amounts of motion with the elongated working element 22. In short, angular displacement of the working element is no longer directly proportional to the movement of the flexible drive member 24. The end effect of this is that, even though the flexible drive member 24 may be operating at constant speed (although this is certainly not required), the working element is not. Note particularly in this regard that relatively little motion of the working end of the element 22 occurs between positions 9' and 11'. Indeed, relatively minor changes in the length of the link 26 (about 10 percent shorter) and/or the location of the outer pivot pin 36 on the working element 22, can result in a complete stop action of the working element at about this location (between positions 9'-11'). This in turn results in intermittent rotary motion of the working element, which can be quite valuable in many situations.

As will be appreciated from the foregoing discussion, relatively minor modifications can be made to this simple version of the chain cam which will serve to significantly modify the resultant motion of the working element. These changes include alteration in the length of the link 26, and change in the location of the pivot connection of the link 26 along the length of the working element 22.

Another important advantage of the chain cam mechanism of the invention is that decelerations and accelerations are typically quite smooth and extended over a significant amount of travel. Therefore, the forces and loads from inertial effects are relatively small, this occurring without any extra design activity as is often required with conventional cam arrangements.

Figure 2:
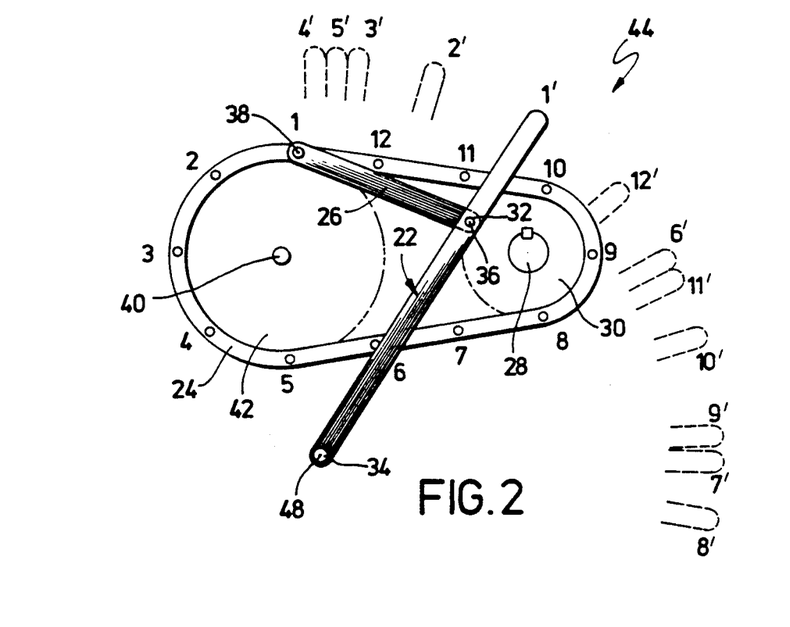
FIG. 2 is a schematic view similar to that of FIG. 1 but showing a second embodiment wherein one end of the working element is pivotally supported outside the confines of the closed loop motive chain, and with representative positions of the working end of the element during movement thereof shown in phantom.

Turning now to FIG. 2, a second chain cam mechanism 44 is illustrated which is identical in all respects to the mechanism 20 save for the fact that the non-working end of the working element 22 is supported outside the confines of the closed loop path of travel defined by the flexible member 24. For ease of reference therefore, where appropriate the same reference numerals are used in connection with the embodiment of FIG. 2, as in the case of FIG. 1. The most significant difference between the two embodiments is that the connection structure 34 associated with the nonworking end of element 22 is pivotally supported on a rigid pivot pin 48 which is outside the path of travel of the flexible member 24.

The embodiment of FIG. 2 gives a resultant motion to the working member 22 which is considerably different than that of FIG. 1. In fact, the resultant motion of the outboard working end of the element 22 is in effect a rocking or reciprocal motion. As in the case of FIG. 1, the 12 numbered positions refer to selected positions of the pin 38, whereas the positions 1'-12' shown in phantom refer to the corresponding positions of the outer end of the element 22. Again, the motion of the flexible member 24 as depicted in FIG. 2 is counterclockwise.

It will be observed that the simple structural change between the embodiments of FIGS. 1 and 2 yields a significant alteration in resulting movement of the free end of element 22, i.e., from circular to reciprocal. In addition, the rocking or reciprocal motion imparted to the working member 22 in the FIG. 2 embodiment is not symmetrical, with the speed being much greater in one direction (i.e., in the only two positions where the element is moving clockwise), with more dwell at the lefthand end (positions 3' through 5'). As in the case of the FIG. 1 embodiment, the actual motion of the element 22 could be significantly modified by changing the lengths between the pivots, addition of supplemental guides for the flexible member 24, or changing the location of the rotational center of the working element 22. Depending upon the selection of these variables, an infinite number of different motions can result such as continuous rotary, intermittent rotary, momentary reversal, reciprocal, high acceleration, low acceleration, long or short dwell periods, symmetrical or unsymmetrical velocities and accelerations.

Although the chain cam mechanisms of FIG. 1 and 2 are different in detail, they have one thing in common—any point on the working element 22 moves in a path which is a circular arc. However, it is within the ambit of the invention to mount the working element 22 such that it does not pivot about a stationary point, i.e., motion can be provided at the inner mounting location of the arm as well as by means of the link 26. This in turn permits a number of possibilities, such as provision of motion paths which do not repeat themselves for many cycles of the flexible drive member. Moreover, such an alternative may make it easier and more feasible to provide multiple working elements for the system.

Figure 3:
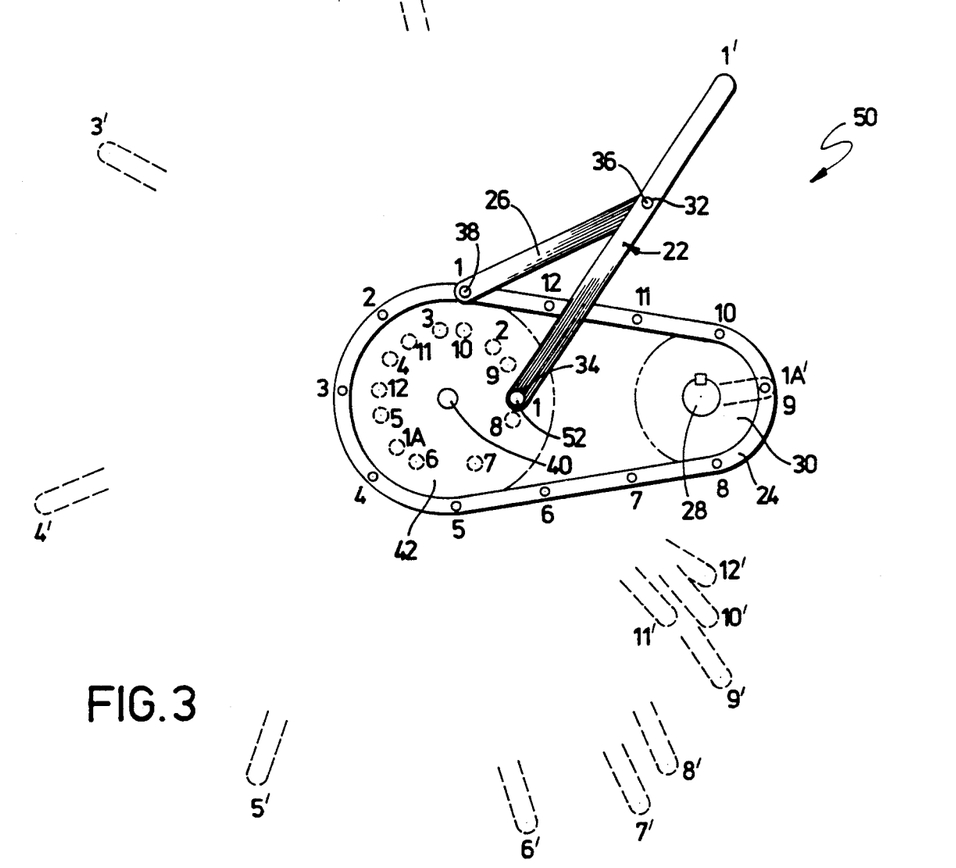
FIG. 3 is a schematic representation of a third embodiment wherein the inner end of the working element is secured to a rotatable socket such that the inner end and the closed loop chain do not make the same number of cycles in the same amount of time to thus impart a resultant motion to the working end of the member which would not repeat itself for multiple cycles, and with representative positions of the element working end during movement thereof being shown in phantom.

In the latter connection, attention is now directed to FIG. 3 which illustrates another embodiment in accordance with the invention. Here again, the chain cam mechanism 50 of this embodiment has many of the structural elements of the embodiments of FIGS. 1 and 2, and where these elements are identical, the same reference numerals have been applied. In detail, the mechanism 50 includes an elongated working element 22 together with a flexible member 24 in the form of a roller chain supported by the drive sprocket 30 mounted on a drive shaft 28, as well as an idler sprocket 42. The latter is in turn supported by a pin or shaft 40. The inner or connection end of the arm 22 is provided with an aperture 34, which is mounted on and pivotal relative to a pin 52. However, it will be observed that pin 52 is affixed to the face of rotatable sprocket 42 and is spaced from the rotational axis of the latter. The overall mechanism further includes a link 26 secured to the flexible member 24 by means of a pin 38 carried by the latter. The remaining end of the link 26 is secured to the arm 22 intermediate the ends thereof through the medium of a connection aperture 32 and pin 36.

An analysis of the motion imparted to the outer end of the working element 22 is also set forth in FIG. 3. Thus, twelve equidistantly spaced positions of the pin 38 are shown as the latter traverses the path of travel of the flexible member 24. In addition, the corresponding positions of the pin 52 have been numbered 1-12, inclusive, and the corresponding positions of the outer end of the element 22 during this motion are illustrated in phantom and labeled as 1'-12'. It will also be seen that positions "1a" and "1a'" have also been provided with respect to the motion of the pins 52 and the inner end of element 22. It will further be seen that these positions "1a" and "1a'" are not the same as positions 1 and 1'. This has been done to demonstrate that the motion imparted to the element 22 does not repeat during every cycle of the flexible drive member 24. This in turn results from the fact that the flexible drive member 24 and the pin 52 do not make the same number of cycles in the same period of time. As can be appreciated, this type of arrangement is capable of producing exceedingly complex motions with very little change in the structural features of the mechanism.

Figure 4:
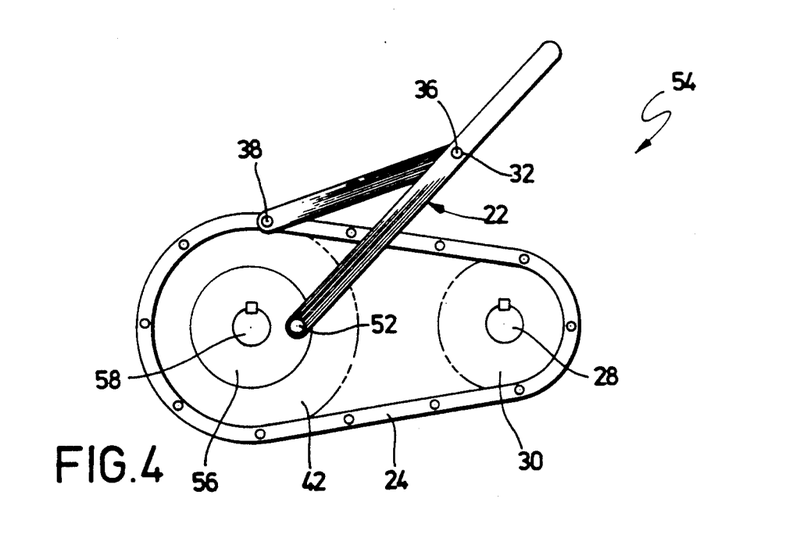
FIG. 4 is a schematic view similar to that of FIG. 3 but illustrating a further embodiment wherein the inner end of the working element is secured to a motion-imparting shaft which is separately powered from the motive assembly for the flexible closed loop chain.

FIG. 4 illustrates another chain cam mechanism 54 which is similar to that of FIG. 3. Here again, like reference numerals are applied where appropriate. The principal difference between the embodiments of FIGS. 3 and 4 is that in the latter case the pin 52 supporting the inner end of the working element 22 is mounted on a sprocket 56 which is separately powered. That is to say, the sprocket 56 is keyed to a driven shaft 58 which is in turn coupled to a drive mechanism including a motor (not shown) which is independent of the motion of driven sprocket 30. The sprocket 42 would of course still be an idler, and would simply rotate relative to the shaft 58.

Those skilled in the art will readily appreciate that the mechanism of FIG. 4 is capable of providing still further complex motions, depending upon the rate of rotation of the sprocket 56 relative to that of the drive sprocket 30.

Apart from the specifically illustrated embodiments of FIGS. 1-4, there are numerous other modifications which can be employed if desired. One such alternative is to add and/or substitute stationary guides for the flexible drive member. The underlying concept here is to alter the path of the flexible member, and thus the motion of all working elements coupled thereto. Two examples of this type of modification are shown in FIGS. 5-12

Moreover, while all of the variations described above involve pivotal or circular motion of the interconnected end of the working elements, the invention is not so limited. That is to say, if desired the inner end of the element could be coupled to a moving device in the form of a second flexible drive member. Here again, the second flexible drive member could be constructed so that it would complete its cycle at the same time as the first drive member, although such would not be necessary.

Finally, in all of the aforementioned embodiments, the flexible drive member has been shown as moving at a constant rate. Such is not essential, however, and a number of other possibilities exist. For example, the flexible drive could be driven through the medium of a crank or geneva mechanism which would impart nonuniform or intermittent motion to the flexible drive member. Here again, the possibilities are virtually limitless, as are the resultant paths of travel imparted to the working members.

The broad concepts illustrated and described above have been used in the construction of chain cam mechanisms finding practical utility. Two such chain cam devices are illustrated in the remaining Figures, and are described in detail below.

Turning now to FIGS. 5-9, a stapling or stitching device broadly referred to by the numeral 56 is provided which makes use of a chain cam mechanism 58. The mechanism 58 includes a plurality of elongated working elements 60, a first motion-imparting member 62, and a second motion-imparting member referred to by the numeral 64. In addition, coupling means 66, 68 are provided for operably coupling the first and second motion imparting members 62, 64 to the elements 60 at corresponding attachment locations along the length of the elements. Finally, apparatus 70 (see FIG. 8) is provided for shifting the members 62, 64 along the respective closed loop paths of travel thereof, in order to thereby correspondingly shift the elements 60 along a desired working path.

In more detail, each of the working elements 60 of mechanism 58 is in the form of an elongated metallic bar, and has a rounded innermost connection end 72 which is apertured as at 74, and an apertured, tapered, outermost working portion or end 76. Further, it will be observed that each of the bars 60 is provided with an aperture 78 (see FIG. 9) intermediate the ends 72, 76 thereof, for purposes which will be made clear.

Figure 5:
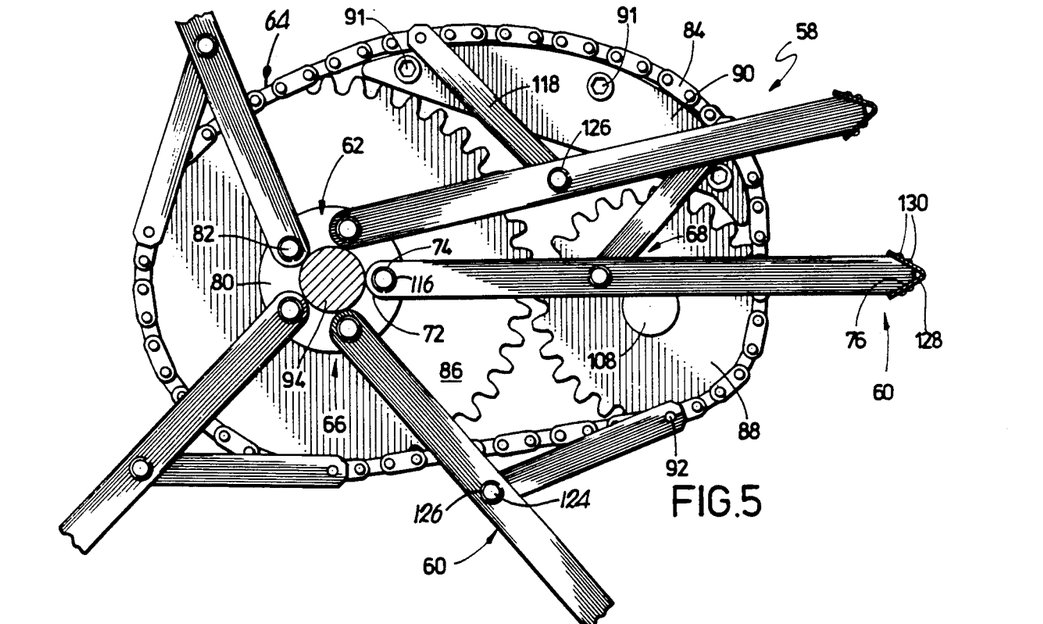
FIG. 5 is a fragmentary view in vertical cross-section of a stapling device in accordance with the invention, wherein the particular chain cam mechanism of the device is depicted in detail.
Figure 9:
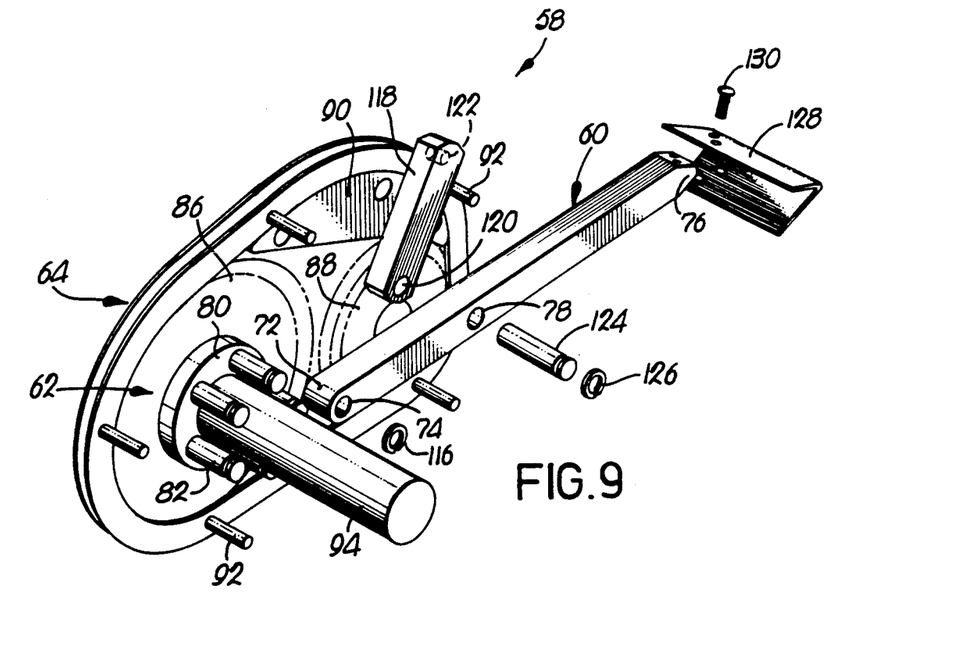
FIG. 9 is a perspective, exploded schematic view of the chain cam mechanism of the embodiment of FIGS. 5-8, illustrating the pivotal connection of one of the elongated working elements.
Figure 10:
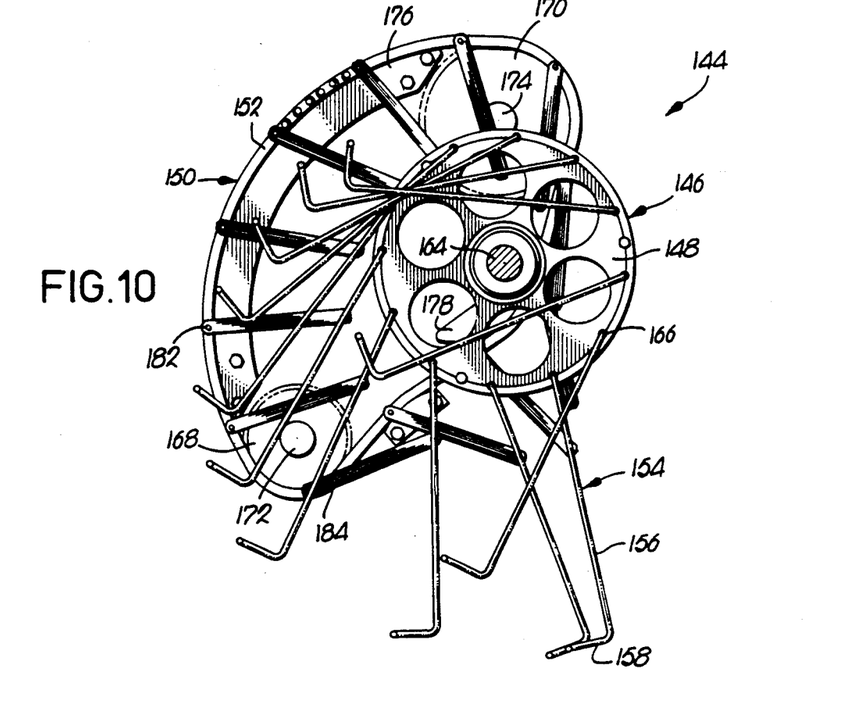
FIG. 10 is a side view, partially in section, of another web handling device in accordance with the invention serving to open and lift a zigzag folded web for subsequent collation.
Figure 11:
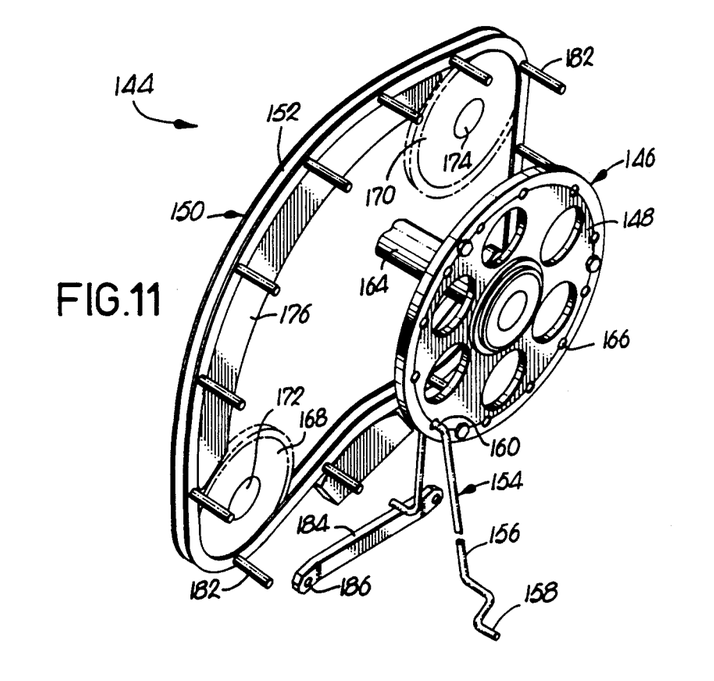
FIG. 11 is a fragmentary, perspective view of the embodiment shown in FIG. 10 illustrating, in exploded format, the orientation of the chain cam mechanism components.
Figure 12:
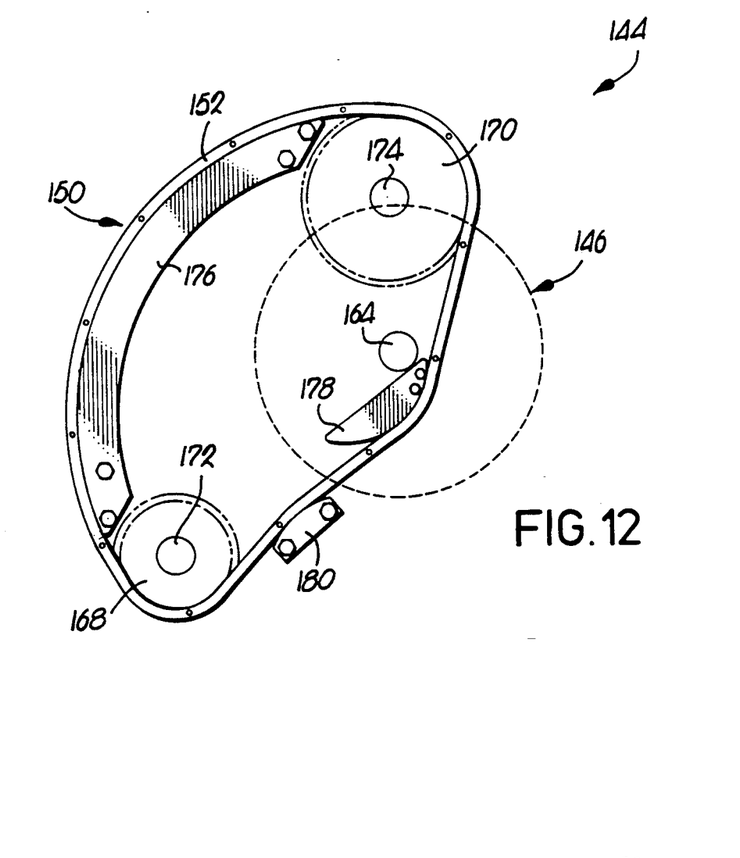
FIG. 12 is a schematic view of one of the chain cam mechanisms forming a part of the embodiment shown in FIG. 10, illustrating the roller chain, chain guide and sprocket.
Figure 13:
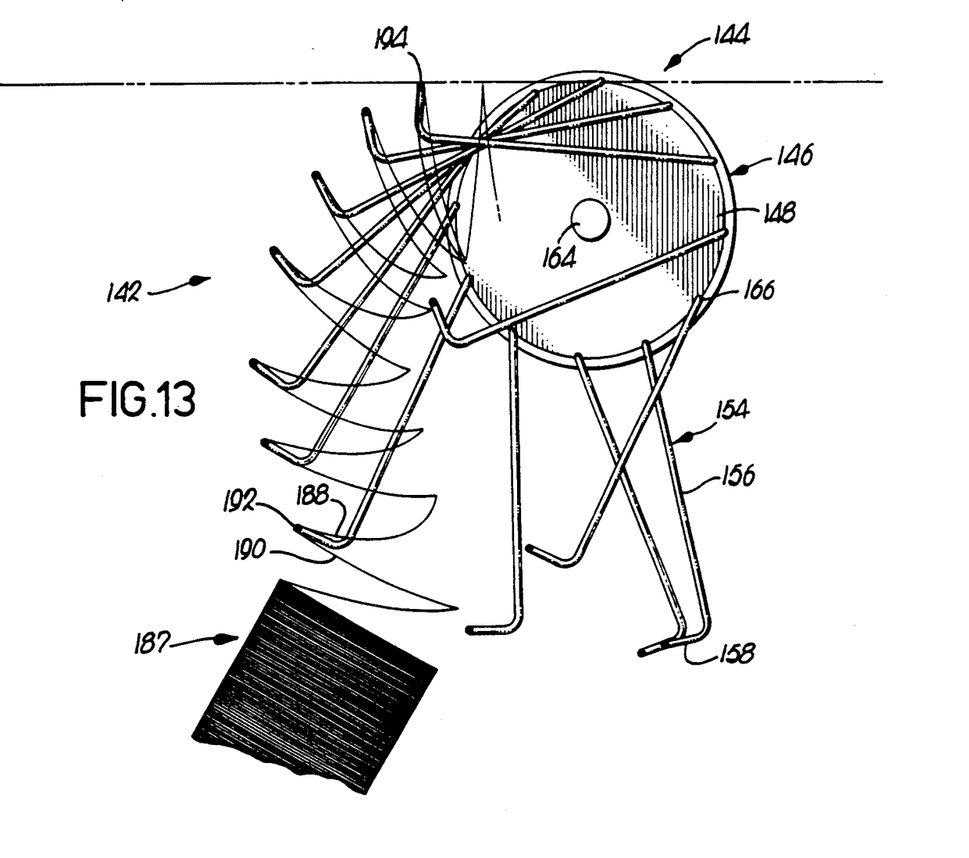
FIG. 13 is a side schematic view of the embodiment shown in FIG. 10 depicting the motion of the wire form working elements when opening and lifting a web stack for subsequent collation.
Figure 14:
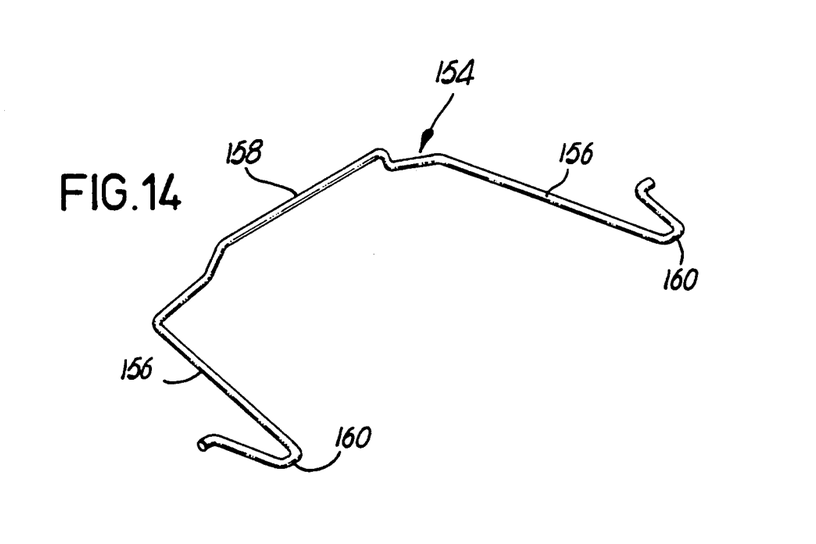
FIG. 14 is a perspective view of one of the wire forms used in the embodiment depicted in FIGS. 10-13.

First motion-imparting member 62 is in the form of a rotatable, annular metallic disc 80 having a plurality of circumferentially spaced, laterally extending element-connecting studs 82 secured thereto (see FIG. 9). On the other hand, the second motion-imparting member 64 includes an elongated, endless, flexible roller chain 84. The latter is supported for movement along a closed loop path of travel by means of a pair of sprockets 86, 88 and arcuate metallic riding block 90. As best seen in FIG. 5, the sprockets 86, 88 are in meshed, driving engagement with the chain 84, while block 90 (secured by means of bolts 91) is a stationary device presenting a thin arcuate outer edge for partially defining the path of travel of the chain. The chain also includes a plurality of elongated, outwardly extending connection studs 92 situated at spaced locations along the length of the chain; here again, the importance of this structure will be made clear hereinafter.

The apparatus 70 serves to support and shift the first and second members 62, 64 along their respective paths of travel. To this end (see FIG. 8) the overall apparatus 70 includes an elongated, transversely extending, axially rotatable drive shaft 94 which is supported by means of conventional bearing structure 96 situated within an upright sidewall 98 forming a part of the mechanism 58. Further, it will be observed that the disc 80 and sprocket 86 are operatively coupled to the shaft 94 for rotation therewith. The outermost end of shaft 94 adjacent wall 98 is provided with a pair of sprockets 100, 102. A main drive chain 104 is trained about sprocket 100 and is operatively connected to a prime mover (not shown) for the stapling device 56. On the other hand, a synchronization chain 106 is trained about sprocket 102 and is in turn connected to downstream processing equipment, likewise not shown.

A sprocket synchronization roller chain 107 is also provided as a part of the apparatus 70, in order to assure synchronous movement of the sprockets 86, 88. For this purpose, the sprocket 88 is supported on an elongated shaft 108, the latter being rotationally supported by means of bearing structure 110 provided in wall 98 (see FIG. 8). The outermost end of shaft 108 has a sprocket 112 keyed thereto, whereas a sprocket 114 is affixed to main drive shaft 94 between sprocket 100 and bearing structure 96. The chain 107 is trained about the sprockets 112, 114, in order to rotate shaft 108, and thus smaller sprocket 88, in synchronism with shaft 94 and larger sprocket 86.

As will be readily apparent from the foregoing discussion, the coupling means 66 serving to operatively secure the inner connection end 72 of the elements 60 to the disc 80 includes the respective connection studs 82, designed to be received within the apertures 74 of the associated elements 60, as well as appropriate locking rings 116 (see FIG. 9). Furthermore, the coupling means 68 includes an elongated linkage arm 118 for each element 60 and is provided with a pair of connection apertures 120, 122 at the respective ends thereof. Connection between the roller chain 84 and the elements 60 is afforded by means of the links 118, with the connection studs 92 secured to chain 84, and with an elongated connector 124 passing through each aperture 78 and an associated linkage arm aperture 120. The connection between the linkage arms 118 and the elements 60 are secured by means of locking rings 126.

The shaft 94 extends laterally from mechanism 58 and is provided with a follower assembly (not shown) adjacent the outboard end thereof. This follower assembly includes a rotatable disc identical with disc 80 secured to the shaft 94 and rotatable therewith. A plurality of follower arms, equal in number to the elements 60, are respectively pivotally coupled with the outboard disc. The follower arms have outermost ends identical with the working ends 76 of the elements 60 (i.e., the outermost ends of the follower arms are apertured and tapered).

The device 56 further includes a plurality of elongated, transversely extending, cross-sectionally V-shaped, web-engaging bars 128. Each of the V-bars is supported adjacent the opposed ends thereof by a working element 60 and a mating follower arm. As best seen in FIG. 9, the outermost or working ends 76 of the elements 60 next within the concavities presented by the associated V-bars, and appropriate threaded connectors 130 are employed to affix the V-bars 128 to the working elements 60; an identical connection is provided between the V-bars 128 and the follower arms adjacent the remaining side of device 56.

Figure 6:
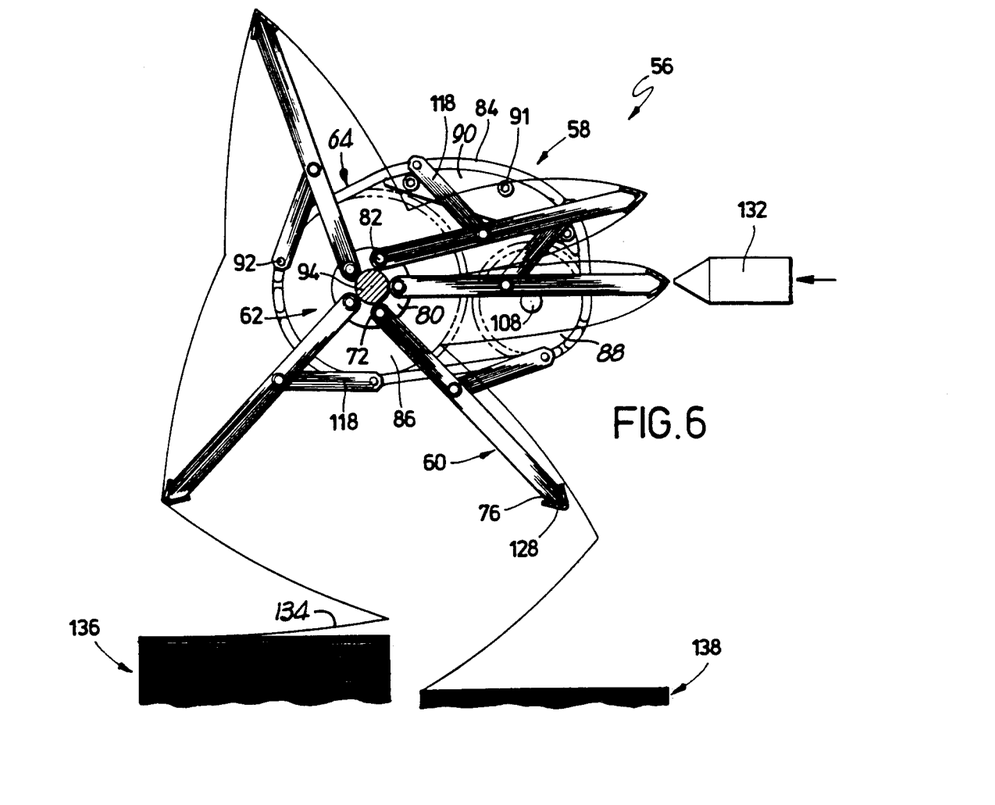
FIG. 6 is a reduced vertical cross-sectional view of the embodiment shown in FIG. 5.
Figure 7:
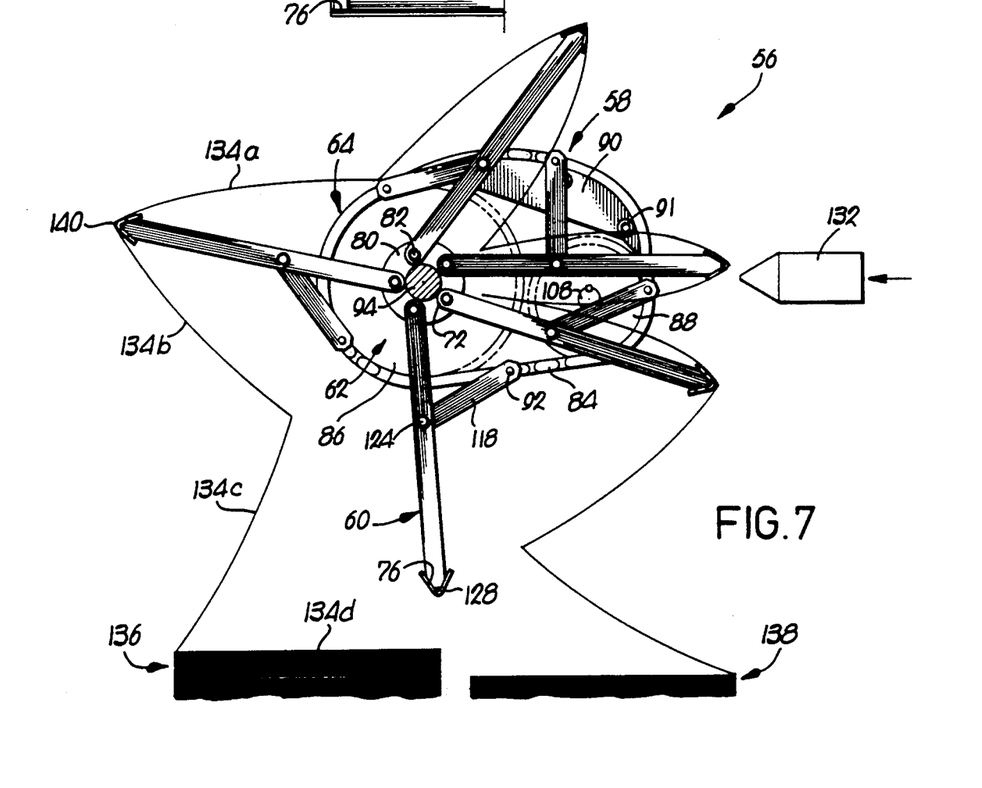
FIG. 7 is a view similar to FIG. 2, with the working elements moved to a different orientation as compared with that of FIG. 6.
Figure 8:
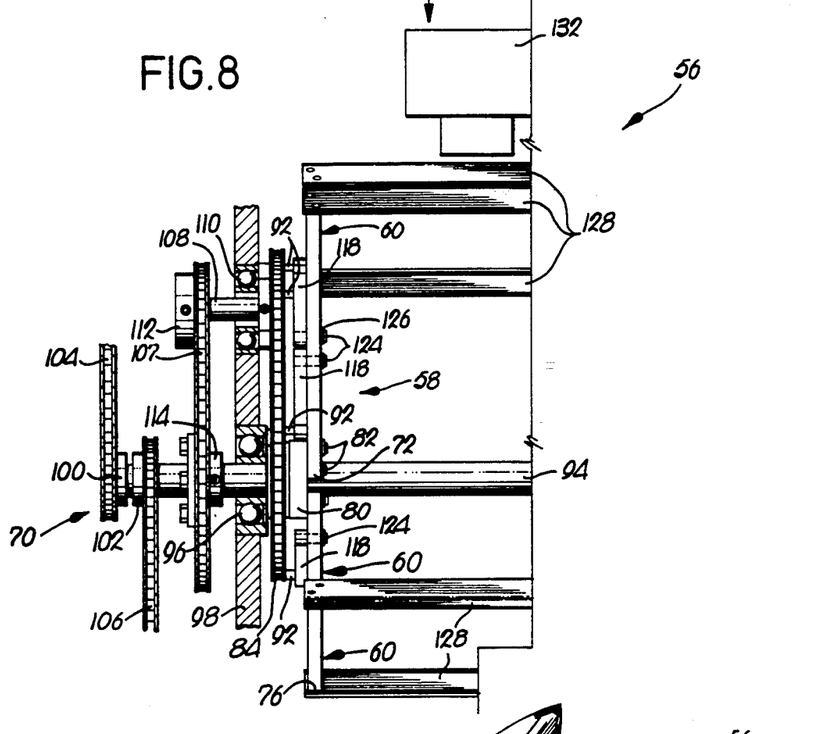
FIG. 8 is a fragmentary, top view, partially in section, of the invention illustrated in FIG. 6.

One or more conventional stitching heads 132 are provided adjacent the righthand end of device 56 as viewed in FIGS. 6 and 7. The purpose of the head 132 is to drive staples into collated webs passing through the device 56.

In the use of device 56, the prime mover operates through the medium of drive chain 104, sprocket 100 and drive shaft 94 to operate the mechanism 58 and thereby rotate the web-engaging structures represented by the V-bars 128 through a defined working path. Specifically, rotation of shaft 94 serves to rotate the disc 80, and this in turn causes the inner ends 72 of the elements 60 to move along a closed loop circular path of travel. At the same time, however, the sprockets 86, 88 are caused to rotate through the medium of shaft 94 and the associated sprocket 114, synchronizing drive chain 107 and shaft 108. This causes the chain 84 to traverse a path of travel defined by the supporting sprockets 86, 88 and block 90. Inasmuch as the respective links 118 are pivotally coupled to the chain 84 and the associated elements 60, movement of the chain 84 imparts a component of movement to the outer ends of the connected elements 60. Thus, the resultant movement of the elements 60 is a summation of the movements imparted thereto by the first and second motion-imparting members 62, 64 respectively. Of course, the described follower assembly is likewise driven by means of shaft 94 and serves to adequately support the V-bars 128.

Referring to FIGS. 6 and 7, it will be observed that, as the respective elements 60 (and hence the interconnected V-bar structure 128) move in a generally clockwise fashion about the closed loop path of travel, they undergo acceleration and deceleration. Specifically, as the respective elements move from approximately a three o-clock position to about a twelve o'clock position, they are accelerated, whereas from the approximate twelve o'clock to the approximate three o'clock position the elements are decelerated and ultimately essentially stopped adjacent the stitching heads 132. This motion is particularly suited for a stitching operation, inasmuch as the plural collated webs 134 may be picked up and quickly elevated whereupon they are moved to a stitching position and essentially stopped in order to permit the heads 132 to operate. Thereafter, as the elements 60 descend back to a pickup position with respect to the stack 136, the now stitched webs 134 are collected into a second web stack 138.

In terms of method aspects, it will further be seen that the device 56 serves to first separate a pair of adjacent sheets from the zigzag folded web stack 136 to an opened pickup configuration wherein the vertical distance between the sheets at the edges thereof remote from the fold lines interconnecting the same is less than the length of the sheets between alternating fold lines. Attention is directed to FIG. 7, wherein it will be seen that the device 56 serves to separate a pair of originally facially opposed sheets 134a and 134b interconnected along a transverse fold line 140 to present the pickup configuration previously described. Further, the device 56 serves to pass the next trailing web-engaging V-bar structure 128 between the separated sheets 134a, 134b and into engagement with the web at the region of fold line 140. Thereafter, as the V-bar 128 is moved away from the pickup configuration depicted in FIG. 7, the fold region 140 is picked up and lifted away from the stack 136 in a manner to orient the next succeeding pair of sheets 134c and 134d in the desired open pickup configuration. Thus, during shifting of the elements 60 and V-bars 128 along their path of travel, the originally zigzag folded webs 134 are sequentially opened, picked up, lifted and moved to a stitching position where they are interconnected. Subsequent movement serves to deposit the now connected webs into the stack 138.

FIGS. 10–14 depict another web-handling device 142 which makes use of a pair of identical, laterally spaced apart chain cam mechanisms 144 (only one of which is shown for ease of illustration). In this instance, each mechanism 144 includes a first motion imparting member 146 in the form of a circular, axially rotatable wheel or disc 148, and a second member 150 comprising a roller chain 152. A plurality of wire forms 154 (see FIG. 14) are interconnected between the laterally spaced apart chain cam mechanisms 144. For this purpose, each of the forms 154 is of somewhat U-shaped configuration and includes a pair of elongated, spaced apart leg portions 156 as well as an irregular, transversely extending, web-engaging bight portion 158. Each of the leg portions 156 terminates in a reverse bend 160 for purpose of connecting the respective leg portions to the associated disc 146 in the manner to be described. Moreover, it will be appreciated that the leg portions 156 of the forms 154 function in the same manner and are equivalent to the elements 60 of the first described embodiment, whereas the bight portion 160 present individual web-engaging structures and are therefore equivalent to the V-bars 128 of the first embodiment.

In greater detail, it will be seen that the disc 148 is of relatively large diameter and includes a central opening for receipt of a drive shaft 164, the latter extending outwardly in a direction away from the central wire forms 154. In addition, the disc 148 is provided with a plurality of circumferentially spaced peripheral apertures 166 therethrough, each of the latter serving to receive a reverse bend portion 160 of a wire form leg (see FIG. 11).

The roller chain 152 is supported for movement by means of a pair of rotatable sprockets 168, 170, the latter being mounted for rotation on respective shafts 172, 174. In addition, the chain-supporting structure includes an elongated curvilinear internal riding block 176 which extends between the sprockets 168, 170, along with a second, smaller, arcuate internal riding block 178 (see FIG. 12). Finally, an external guiding block 180 is also provided between sprocket 168 and internal riding block 178. As can be readily appreciated, the respective sprockets 168, 170, as well as the blocks 176, 178, and 180, serve to define a closed loop path of travel for the roller chain 152.

Again referring to FIGS. 10–12, it will be seen that the roller chain 152 includes a plurality of spaced apart connection studs 182 along the length thereof. A linkage arm 184 is pivotally secured to each connection stud 182, and for this purpose the linkage arms are apertured as at 186. Of course, those skilled in the art will readily appreciate that each arm aperture 186 receives an associated connection stud 182, with appropriate snap rings or the like being used to pivotally secure each arm to its associated connection stud 182. The end of each of the arms 184 remote from chain 152 is pivotally secured to the adjacent reverse bend portion 160 of one of the wire forms 154. Here again, this pivotal connection between the arms 184 and the forms 154 is effected by means of appropriate, conventional connection structure.

Drive for the disc 148 and roller chain 152 is provided in a manner similar to that described in connection with the first embodiment. That is to say, a prime mover is connected to the shaft 164 of one of the laterally spaced apart chain cam mechanisms 144 by means of a conventional chain and sprocket drive. Moreover, synchronization between the drive shaft 164 and the shaft 174 of the sprocket 170 is provided by means of conventional chain and sprocket synchronization structure (the sprocket 168 is merely an idler). Finally, synchronization between the respective chain cam mechanisms 144 is provided by wholly conventional structure (not shown) interconnecting the drives of the laterally spaced mechanisms 144.

In the use of device 142, the respective chain cam mechanisms 144 are operated through the described prime mover and synchronization apparatus, so as to simultaneously rotate the discs 148 and shift the chains 152 along their closed loop paths of travel. As a consequence, the wire forms 154 are moved in a relatively complex manner particularly designed for engaging and lifting a zigzag-folded web to an overhead position for further collation or handling. In this connection, attention is specifically directed to FIG. 13 which illustrates the motion of the wire forms 154, and particularly the bight portions 158 thereof. Specifically, it will be observed that a zigzag folded web stack 187 is provided which is made up of a plurality of interconnected web sheets such as the sheets 188, 190 interconnected along a transverse marginal fold line 192. During movement of the bight portions 158, the latter first engage the zigzag-folded web at a fold region such as the fold line 192 depicted in FIG. 13. As the bight portions 158 move away from the initial pickup location, it will be seen that the web is moved in a rapid fashion upwardly and laterally away from the stack 187 until an uppermost position 194 is reached. At this point the web is grasped by conventional conveyor structure for further downstream handling. As the web is so grasped and pulled from the bight portions 158, the associated wire forms reverse direction (see FIG. 13) and are moved downwardly in position for another web pickup operation. Hence, it will be seen that while the reverse bend portions 160 connected to disc 148 continuously rotate in a clockwise direction, the opposed working ends represented by the bight portions 158 first move in a clockwise direction from about the pickup location of the web to the overhead delivery position, and then reverse direction and travel in a counterclockwise fashion so as to return to the pickup location. As indicated above, this reversal of motion can be quite readily achieved with the working mechanism of the present invention, whereas such complex motion had been very difficult to reliably attain with prior mechanical devices.

I claim:

1. A working mechanism, comprising; at least one elongated working element having a working portion; and means for shifting said working portion of said element along a working path, including:
   first and second connector structures on said working member at corresponding first and second spaced apart locations along the length of said working member;
   an elongated, flexible, motion-imparting member shiftable along a continuous, closed loop path of travel;
   means connecting said motion-impairing member to said first connector structure, including linkage means pivotally secured at separate zones thereon to said motion-imparting member and said first connector structure respectively;
   means different than and separate from said motion-imparting member operably coupled with said second connector structure for supporting said working element during said shifting thereof; and
   apparatus for shifting said motion-imparting member along said path of travel thereof.

2. The working mechanism as set forth in claim 1, there being a plurality of said working elements.

3. The working mechanism as set forth in claim 1, said motion-imparting member comprising a continuous chain.

4. The working mechanism as set forth in claim 1, said linkage means comprising an elongated link, said zones being located at respective ends of said link.

5. The working mechanism as set forth in claim 1, said means for supporting said working member comprising a pivotal mounting.

6. The working mechanism as set forth in claim 1, said means for supporting said working member comprising an additional motion-imparting member shiftable along a continuous, closed loop path of travel.

7. The working mechanism as set forth in claim 6, said additional motion-imparting member comprising a rotatable body, said second connection structure of said working element being pivotally coupled to said body.

8. The working mechanism as set forth in claim 7, said rotatable body being driven for imparting movement to said working element.

9. The working mechanism as set forth in claim 7, there being means operably coupling said motion-imparting member and said additional motion-imparting member for synchronous movement thereof.

10. The working mechanism as set forth in claim 7, said working element being oriented with said second connector structure thereof within the closed loop path of travel of said elongated, flexible, motion-imparting member.

11. The working mechanism as set forth in claim 7, said working element being oriented with said second connector structure thereof outside the confines of said closed loop path of travel of said elongated, flexible, motion-imparting member.

12. The working mechanism as set forth in claim 1, including motive means operably coupled with said working element supporting means, said motive means being separate from said apparatus for powered movement of said working element supporting means and said motion-imparting member respectively.

13. The working mechanism as set forth in claim 1, said means coupled with said second connector structure being spaced from said motion-imparting member.

14. A working mechanism, comprising:
   at least one elongated working element having a working portion; and
   means for shifting said working portion along a working path, including:
   first and second motion-imparting members each being shiftable along a corresponding continuous closed loop path of travel, at least one of said members comprising an elongated, endless flexible component,
   means for operably coupling said first and second members to said element at corresponding spaced apart first and second attachment locations along the length of the element, including structure for pivotally coupling at least one of the motion-imparting members to the element; and
   apparatus for shifting said members along said paths of travel thereof for shifting of said coupled working portion along said working path.

15. The mechanism as set forth in claim 14, said first member comprising a rotatable body, said coupling means having structure for moving a portion of said element adjacent said first attachment location along an essentially circular path of travel.

16. The mechanism as set forth in claim 14, said component comprising a chain with an arm pivotally secured to said chain, said arm also being pivotally coupled with said element at said second attachment.

17. The mechanism as set forth in claim 14, said first and second members each being pivotally coupled with said element.

18. The mechanism as set forth in claim 14, there being means operably coupling said first and second members for synchronous movement there of.

19. The mechanism as set forth in claim 14, there being a plurality of said elements, and means for operably coupling said first and second members to said elements at corresponding spaced apart first and second attachment zones along the length of the elements.

20. The mechanism as set forth in claim 19:
   said first member comprising a circular in cross section, rotatable body, one end of each said elements being pivotally secured to said body; and
   said second member being said component and comprising a chain with arms pivotally secured to said chain at spaced zones along the length thereof, the end of each arm remote from said chain being pivotally coupled with a corresponding element at an attachment zone intermediate the ends of the element.

21. The mechanism as set forth in claim 20, said first member being driven in unison with a sprocket, said chain being trained about said sprocket.

22. The mechanism as set forth in claim 21, said sprocket being driven and forming a part of said shifting apparatus.

23. The mechanism as set forth in claim 20, there being at least one sprocket supporting said chain, said sprocket and body being coupled for synchronous movement.

24. The mechanism as set forth in claim 14, said apparatus including means for shifting said members at respective, constant speeds.

25. The mechanism as set forth in claim 14, said coupling means serving to respectively maintain said first and second attachment locations a fixed distance apart.

26. Apparatus for handling an elongated, continuous web which is zigzag-folded to present a web stack having a plurality of facially opposed sheets interconnected by alternating fold lines respectively located along opposite side margins of the stack, said apparatus comprising:

a plurality of elongated web-engaging structures;

means for successively and repeatedly moving said structures along a closed-loop working path of travel for, sequentially;

(1) passing a structure between a separated pair of said sheets and into engagement with the web at a fold region adjacent the fold line interconnecting the sheets while said separated sheets are in an opened pickup configuration wherein the vertical distance between the sheets at the edges thereof remote from the fold line interconnecting the same is less than the length of the sheets between alternating fold lines; and (2) thereafter further moving the element to pick up and lift the engaged fold region away from the stack in a manner to orient the next succeeding pair of sheets in said opened pickup configuration for entry therebetween of another web-engaging structure, said structure moving means comprising:

first and said second motion-imparting members each being shiftable along a corresponding, continuous, closed loop path of travel, at least one of said members comprising an elongated, endless, flexible component;

an elongated mounting element for each web-engaging structure respectively;

means for operably coupling said first and second members to said elements at corresponding spaced apart first and second attachment locations along the length of the elements, including structure for pivotally coupling at least one of the members to the elements; and apparatus for shifting said members along said paths of travel thereof for shifting of said coupled working portions along said paths of travel thereof.

27. Apparatus as set forth in claim 26, said first member comprising a rotatable body, said coupling means having structure for moving portions of said elements adjacent said first attachment locations along an essentially circular path of travel.

28. Apparatus as set forth in claim 26, said second member being said component and comprising a chain with arms pivotally secured to said chain at spaced zones along the length thereof, said arms also being pivotally coupled with said elements at said second locations.

29. Apparatus as set forth in claim 26, said first and second members each being pivotally coupled with said elements.

30. Apparatus as set forth in claim 26, there being means operably coupling said first and second members for synchronous movement thereof.

31. Apparatus as set forth in claim 26, said first member comprising a circular in cross section, rotatable body, one end of each said elements being pivotally secured to said body; and said second member being said component and comprising a chain with arms pivotally secured to said chain at spaced zones along the length thereof, the end of each arm remote from said chain being pivotally coupled with a corresponding element intermediate the ends of the element.

32. Apparatus as set forth in claim 26, said shifting apparatus including means for shifting said members at respective, constant speeds.

33. Apparatus as set forth in claim 26, said coupling means serving to respectively maintain said first and second attachment locations a fixed distance apart.

34. Apparatus as set forth in claim 26, said structure moving means including means for slowing the speed of travel of each of said elements during a portion of the travel thereof along said closed loop path of travel.

35. Apparatus for stapling one or more elongated, continuous, zigzag-folded, aligned webs each having a plurality of sheets interconnected by transverse fold lines, said apparatus comprising:

a plurality of web-engaging structures;

mechanism for moving said structures along a working path of travel for successively causing said structures to first engage and support a corresponding fold region of the web adjacent a fold line thereof, and then to shift the engaged and supported fold region to a stapling area whereupon the fold region is momentarily stopped; and stapling means located at said stapling area for stapling the web when the latter is stopped.

36. Apparatus as set forth in claim 35, said mechanism comprising:

an elongated mounting element for each structure respectively;

first and second motion-imparting members each being shiftable along a corresponding, continuous, closed loop path of travel, at least one of said members comprising an elongated, endless flexible component;

means for operably coupling said first and second members to said elements at corresponding spaced apart first and second attachment locations along the length of the elements, including structure for pivotally coupling at least one of the members to the elements; and apparatus for shifting said members along said paths of travel thereof.

* * * * *

UNITED STATES PATENT AND TRADEMARK OFFICE
CERTIFICATE OF CORRECTION

PATENT NO.   :   5,058,872
DATED        :   October 22, 1991
INVENTOR(S)  :   Dean E. Gladow It is certified that error appears in the above-identified patent and that said Letters Patent is hereby corrected as shown below:

On the title page:
"[73] Assignee:   Didde Web Press Corp., Emporia, Kans." should be deleted Signed and Sealed this Sixteenth Day of March, 1993

Attest:

STEPHEN G. KUNIN

*Attesting Officer*     *Acting Commissioner of Patents and Trademarks*